(12) United States Patent
Rauch

(10) Patent No.: US 6,508,015 B1
(45) Date of Patent: Jan. 21, 2003

(54) BREATHING SOLE

(76) Inventor: Max Rauch, Willi-Stamer-Str. 23, 82031 Grünwald (DE)

( * ) Notice: Subject to any disclaimer, the term of this patent is extended or adjusted under 35 U.S.C. 154(b) by 0 days.

(21) Appl. No.: 09/155,543
(22) PCT Filed: Feb. 6, 1997
(86) PCT No.: PCT/DE97/00240

§ 371 (c)(1),
(2), (4) Date: May 7, 1999

(87) PCT Pub. No.: WO97/28711

PCT Pub. Date: Aug. 14, 1997

(30) Foreign Application Priority Data

Feb. 8, 1996 (DE) ..................... 296 01 932 U

(51) Int. Cl.[7] .............. A43B 7/06; A43B 13/12
(52) U.S. Cl. .............. 36/3 B; 36/3 R; 36/30 R
(58) Field of Search ............ 36/3 R, 3 A, 3 B, 36/9 R, 8.1, 10, 30 R

(56) References Cited

U.S. PATENT DOCUMENTS

| | | | |
|---|---|---|---|
| 2,030,545 A | * | 2/1936 | Schulze ............ 36/3 B |
| 3,383,782 A | * | 5/1968 | McGinnity ............ 36/3 B |
| 3,953,366 A | | 4/1976 | Morrison |
| 4,069,515 A | * | 1/1978 | Swallow et al. ........... 36/59 R |
| 4,187,390 A | | 2/1980 | Gore |
| 4,194,041 A | | 3/1980 | Gore |
| 4,493,870 A | | 1/1985 | Vrouenraets et al. |
| 4,651,354 A | * | 3/1987 | Petrey ............ 36/3 R |
| 4,725,481 A | | 2/1988 | Ostapchenko |
| 5,044,096 A | | 9/1991 | Polegato |
| 5,746,012 A | * | 5/1998 | Caletti et al. ......... 36/3 B |

FOREIGN PATENT DOCUMENTS

| | | |
|---|---|---|
| DE | 748646 | 5/1943 |
| DE | 748 646 C | 11/1944 |
| DE | 42 14 802 A | 11/1993 |
| DE | 4214802 A1 | 11/1993 |
| EP | 0 382 904 A | 8/1990 |

* cited by examiner

*Primary Examiner*—M. D. Patterson
(74) *Attorney, Agent, or Firm*—Carol A. Lewis White

(57) ABSTRACT

Breathable outsole (11) for footwear, in which the outsole has a two-layer structure. The two-layer structure contains an elastic and water vapor-permeable inner layer (1) and an outer layer (2) that covers less than 70% of the inner layer (1).

The breathing activity of outsole (11) is guaranteed by the preferably microporous structure of inner layer (1) and the configuration of outer layer (2). The configuration of outer layer (2) is such that the surface of inner layer (1) available for water vapor exchange is restricted as little as possible. A microporous structure of insole (1) is achieved, for example, by a sintered plastic.

4 Claims, 3 Drawing Sheets

BREATHING SOLE

FIELD OF THE INVENTION

The invention concerns a breathable outsole for footwear.

BACKGROUND OF THE INVENTION

Two commonly employed methods to apply the outsole to the bottom of the wrapped-around leg ends and any insole present are considered in the production of shoes.

One method entails injection molding or vulcanization of an outsole material. During injection molding or vulcanization, plastics, like polyurethane or polyvinyl chloride, or rubber are primarily used. These materials are not water vapor-permeable.

Another method is based on gluing of premolded outsoles. These outsoles can consist of leather or premolded plastic parts. The plastic parts are again not water vapor-permeable.

Although leather is water vapor-permeable, passage of water vapor is hampered by the usually whole-surface application of nonbreathable adhesive under the surface of the outsole and/or bottom of the wrapped-around leg ends and any insole that is present. For this reason, in both cases breathing activity or removal of sweat from the shoe interior is not offered at least via the soles.

In recent years the requirements for wearing comfort of shoes have risen significantly. Among other things, the problem of moisture buildup in the shoe has emerged as significant.

Moreover, there have been many developments recently for production of watertight but water vapor-permeable shoes. Efforts were mostly concentrated on the shoe leg and insole. A watertight but water vapor-permeable membrane material was used with which the shoe was sealed in the interior in different ways and greater wear comfort thus achieved. A watertight, water vapor-impermeable injection molded rubber or plastic outsole is generally used in these shoes.

These outsoles consist of elastic material and can be produced in different configurations. Polyurethane, transparent rubber or polyvinyl chloride is used as the material.

However, breathing activity in the sole region is blocked because of the watertight but water vapor-impermeable properties of the outsole. This shortcoming leads to accumulation of perspiration moisture in the shoe interior, especially above the sole. However, it is desirable to improve the wearing comfort in the sole region even of watertight footwear.

A three-layer sole structure for shoes is known from U.S. Pat. No. 5,044,096 (EP-B-0 283 904) (inventor: Mario Polegato, applicant: Crocetta Del Montello) that has an outsole provided with perforations, an insole provided with perforations and a functional layer in between consisting of a watertight, water vapor-permeable material. This is supposed to create the possibility of withdrawing perspiration moisture in the form of water vapor through this sole structure without water being able to penetrate into the shoe through this sole structure.

Perforation of the outsole is problematical in this design. The reason for this is that the functional layer material used for watertight, water vapor-permeable articles of clothing and shoes is relatively sensitive mechanically. Stones or other foreign objects that penetrate the preformation of the outsole of this sole structure lead with high probability to perforation of the functional layer so that the watertightness of this sole structure is eliminated.

Another shortcoming is that the surface actually available for water vapor exchange is too small to permit effective breathing activity of the sole.

If the stones or foreign objects blocking the perforations are added to this, one can no longer speak of a breathable sole.

In addition, the arrangement of the perforations is stipulated in limiting fashion by the tread configuration of the sole bottom.

The task of developing an effective, breathable outsole for both normal and watertight footwear follows from this set of problems.

SUMMARY OF THE INVENTION

This task is solved according to the invention in that the outsole is in two layers with an elastic and water vapor-permeable inner layer and an outer layer that covers less than 70% of the inner layer. A covering of less than 50%, especially less than 30% is preferred.

Excellent breathing activity in the sole region is guaranteed by the combination and configuration of these two layers.

In a preferred variant the elastic and watertight inner layer is microporous.

The microporous structure of the inner layer guarantees unhampered water vapor transport. The inner layer preferably has an average pore width from 3 $\mu$m to 250 $\mu$m.

The desired shape of the inner layer can be cut to size from this material. The thickness of the inner layer material is guided according to the requirements on the sole, especially adequate resistance to external mechanical effects. This is significant when penetration of sharp objects, like stones, for example, is to be prevented.

The microporosity guarantees optimal water vapor transport and at the same time forms an effective barrier against penetration of gravel, dust, etc. owing to the limited pore size.

A sintered plastic is preferably used as material for the inner layer. Polyester, polypropylene or polyethylene is especially suited as plastic.

Felt, nonwoven, woven or knitted fabrics made of plastics, like polyester, polypropylene or polyethylene, can also be processed into a functional inner layer.

The inner layer in this embodiment likewise possesses the necessary elasticity in order to find use as part of an outsole.

The inner layer can also serve as support for the parts of the outer layer fastened to it.

It is also possible that the inner layer is used as support for additional advantageous layers.

The configuration of the outer layer is chosen so that the surface of the inner layer available for water vapor exchange is kept as small as possible. This is achieved in that the outer layer covers less than 70%, preferably less than 50%, especially less than 30%, of the inner layer. High breathing intensity of the inner layer can thus be maintained.

The outer layer can contain several individual parts joined together or consist of a prepunched shape. These individual parts can be injection molded or vulcanized or glued and the prepunched shape is glued.

The structure of the outer layer is formed by an edge corresponding to the outer contours of the foot that fits into the footwear. This outer edge primarily has the function of providing the sole with a stable outer frame and thus a secure tread.

In an injection molded outer layer the edge is formed by enclosing the outer periphery of the inner layer and the wrapped-around lower leg ends.

In addition, the outer layer is advantageously formed by spot- or strip-like elements, especially in the form of knobs or ribs. With the spot- or strip-like design of the outer layer a situation is achieved in which the sole acquires a firm and comfortable tread and at the same time covers only a limited surface of the bottom of the inner layer. This type of configuration of the outer layer, in which less than 70% of the inner layer is covered, also largely avoids retention of larger particles, for example, stones, in the outer layer, which will lead to reduced or even hampered water vapor exchange.

With an outer layer designed in this fashion essentially unhampered water transport can occur through the entire sole. In this fashion it is guaranteed that the perspiration moisture in the sole region can be withdrawn.

A limited part of the bottom of the inner layer is covered by the parts or elements of the outer layer despite the advantageous embodiment of the invention and is thus lost for water vapor exchange. Water vapor particles can accumulate for this reason on the shoe interior of the outer layer parts or outer layer mold.

In a preferred variant the inner layer therefore has openings through which the elements of the outer layer are injected so that the openings are filled and the elements are anchored to the inner layer. The water vapor particles can therefore reach the outside additionally along the openings and optimal ventilation of the sole is guaranteed.

In another variant of the invention the microstructure of the inner layer can be configured so that it contains additional hydrophobic properties or is watertight. This is achieved by appropriate manufacture of the sintered plastic. To achieve this it is possible, for example, to process sintered polyethylene in the high molecular or ultrahigh molecular state.

In addition, a watertight and water vapor-permeable functional layer, preferably from microporous, expanded PTFE, can be applied to the inner layer. It is also possible to make the sole watertight. In this case the condition or microporosity of the inner layer is advantageous, since this rules out entry of sharp or abrasive particles, for example, sand, and thus protects the functional layer from mechanical damage.

The outsole according to the invention can be used in any type of footwear.

DETAILED DESCRIPTION OF THE INVENTION

Figure 1:
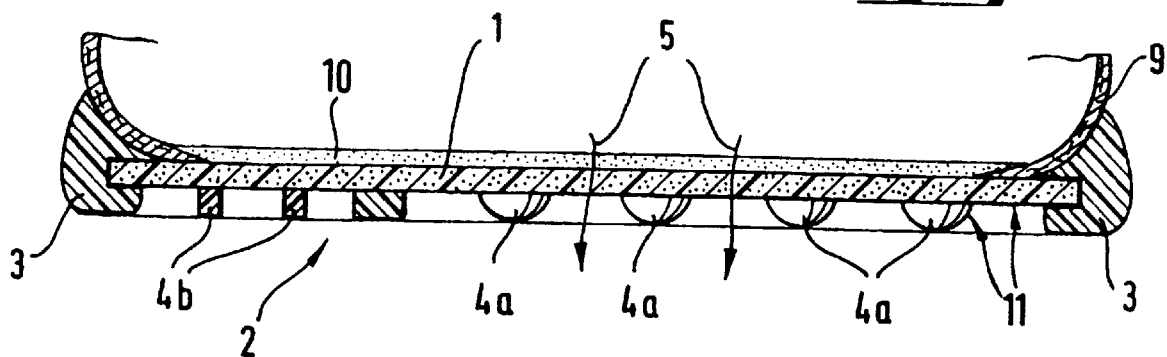
FIG. 1 shows a longitudinal section of the sole consisting of inner layer (1) and outer layer (2)

FIG. 1 shows a sole with a leg 9, an insole 10, as well as the outsole 11 according to the invention. The outsole 11 contains an elastic and microporous inner layer 1 and an outer layer 2. The inner layer 1 preferably consists of sintered plastic. Polyethylene, polypropylene or polyester are considered as materials.

The microporous structure of the inner layer 1 is water vapor-permeable. Withdrawal of perspiration moisture 5 from the shoe interior is thus ensured. In addition, the inner layer 1 serves as support for an outer layer 2.

The outer layer 2 is applied to the bottom of inner layer 1. The outer layer 2 is preferably applied by injection molding of plastics generally used for this purpose, like polyurethane, polyvinyl chloride. The multipart outer layer 2 is composed of enclosure 3 of the outer periphery of the inner layer and leg 9 and the elements 4a or 4b injection molded onto the bottom of inner layer 1. The enclosure 3 primarily has the function of imparting to the sole of the shoe a firm hold and tread.

Part of the surface of inner layer 1 is lost for water vapor exchange because of injection molding. However, to maintain high breathing activity of inner layer 1 the outer layer 2 is specially designed. Thus, the parts of outer layer 2 are formed so that the surface of inner layer 1 available for water vapor exchange is restricted as little as possible.

This preferably occurs by injection molding of spot-like 4a or strip-like 4b elements. Especially preferred versions for this purpose are knobs 4a or ribs 4b.

Withdrawal of perspiration moisture 5 from the shoe interior occurs through the micropores of inner layer 1 and past parts 3, 4a, 4b of outer layer 2 to the surroundings.

Figure 2:
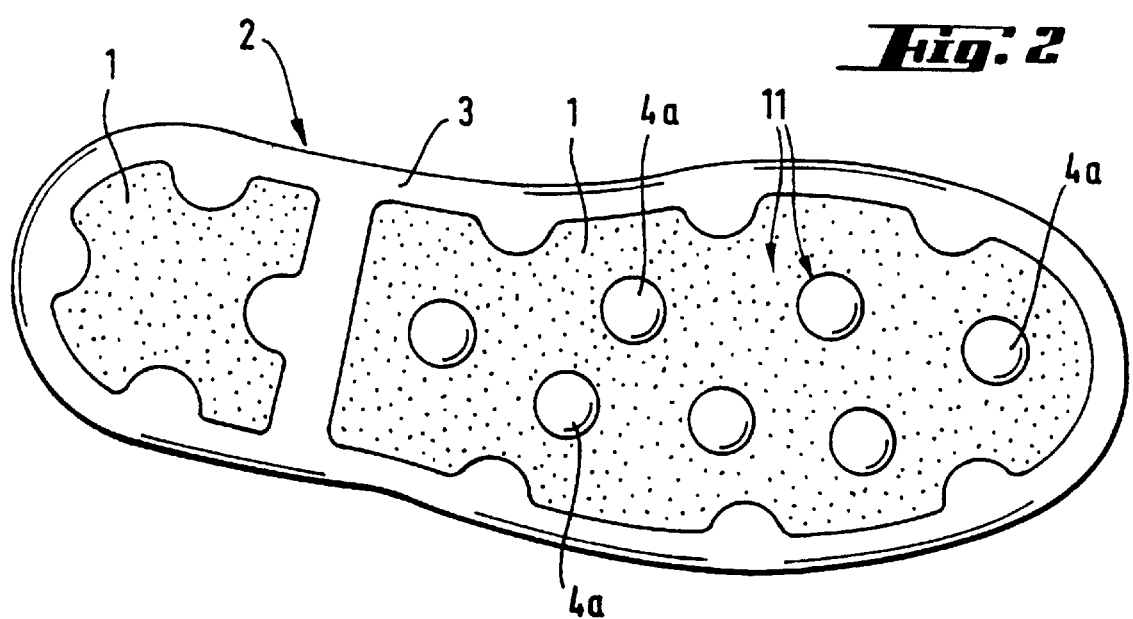
FIG. 2 shows a top view of the outsole bottom (11) with knobs (4a)

FIG. 2 shows how the outer layer 2 with knobs 4a can be arranged.

Figure 3:
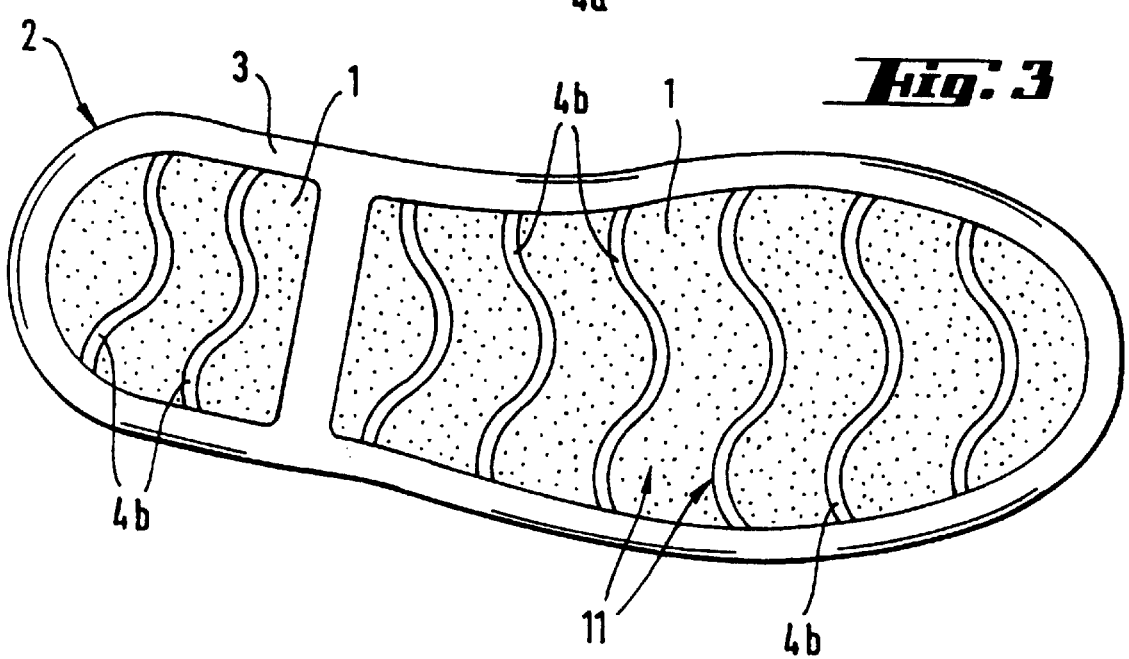
FIG. 3 shows a top view of the outsole bottom (11) with ribs (4b)

The outer layer 2 is equipped with ribs 4b in FIG. 3.

FIGS. 2 and 3 clarify that the outer layer 2 covers less than 70% of the inner layer 1.

Figure 4:
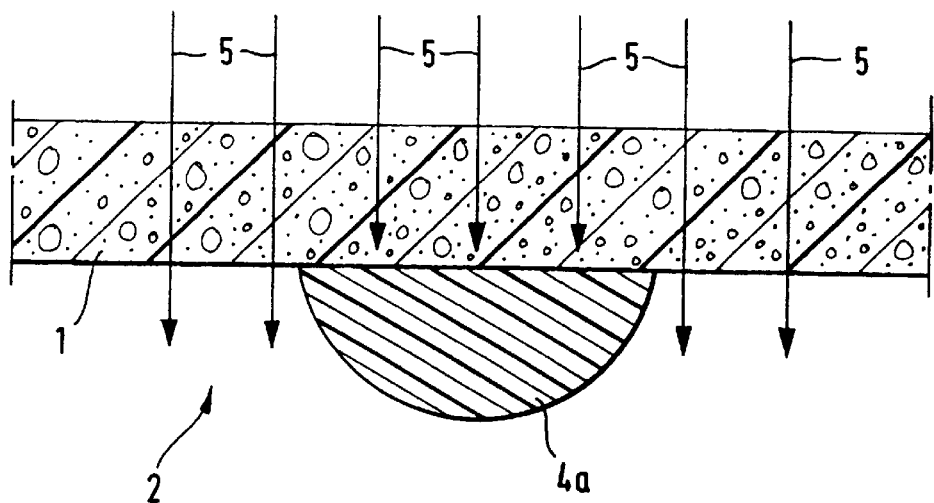
FIG. 4 shows a section of outsole (11) with the injection molded, spot-like outer layer part (4a)
Figure 5:
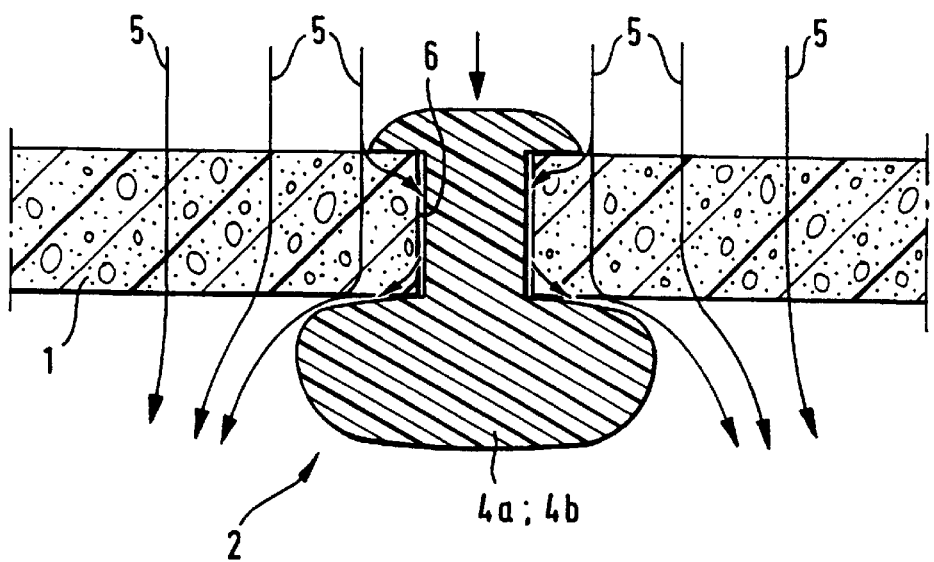
FIG. 5 shows a section of the outsole (11) with anchored, spot-like outer layer p art (4a, 4b)

In the next FIGS. 4 and 5 the breathable behavior of inner layer 1 as a function of outer layer 2 is shown. FIG. 4 shows an outsole according to the invention with an inner layer 1 and an injection molded element 4a of outer layer 2. The behavior of the water vapor 5 on passing through inner layer 1 is shown by the direction of the arrows. It is apparent from this figure that an outlet for water vapor 5 from inner layer 1 is blocked at the site where element 4a is injection molded onto the inner layer 1 and in this fashion accumulation of water vapor particles occurs.

To avoid this problem another advantageous variant as shown in FIG. 5 is used, in which the element 4a of the outer layer 1 is injected through corresponding opening 6 in inner layer 1 and anchored on the inside of inner layer 1. In this variant no external closure of the microporous structure of inner layer 1 occurs, since the water vapor 5 can escape along opening 6.

Figure 6:
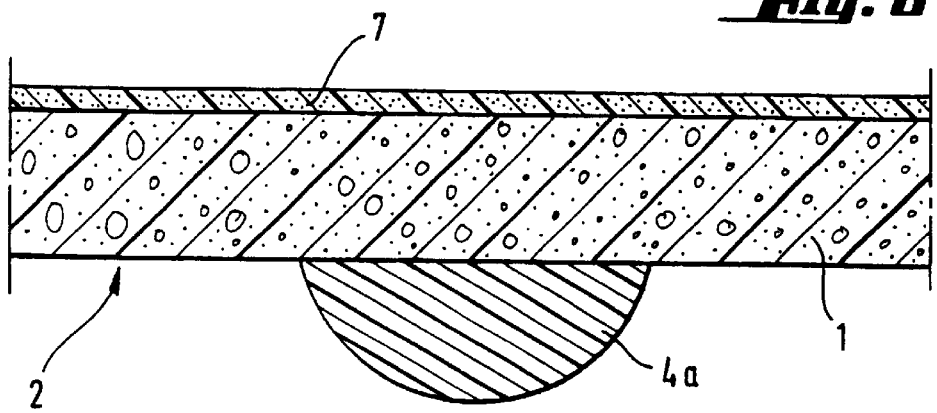
FIG. 6 shows a breathable outsole (11) with functional layer (7)

The configuration of a breathable and watertight shoe sole can also be achieved by using a functional layer above inner layer 1. A preferred arrangement is shown in FIG. 6. An outsole 11 is provided with a functional layer 8 above inner layer 1. The inner layer 1 is carrier for the functional layer 8 in addition to its breathable properties. This functional layer consists of a watertight and water vapor-permeable membrane material and can preferably be ironed onto the sole.

Appropriate materials for functional layer 8 include microporous expanded polytetrafluoroethylene (PTFE), as described in U.S. Pat. Nos. 3,953,366 and 4,187,390; expanded PTFE that is provided with hydrophilic impregnating agents and/or layers, as described in US Pat. 4,194,041; breathable polyurethane layer; or elastomers, like copolyether-ester and their laminates, as described in U.S. Pat. Nos. 4,725,481 and 4,493,870.

Figure 7:
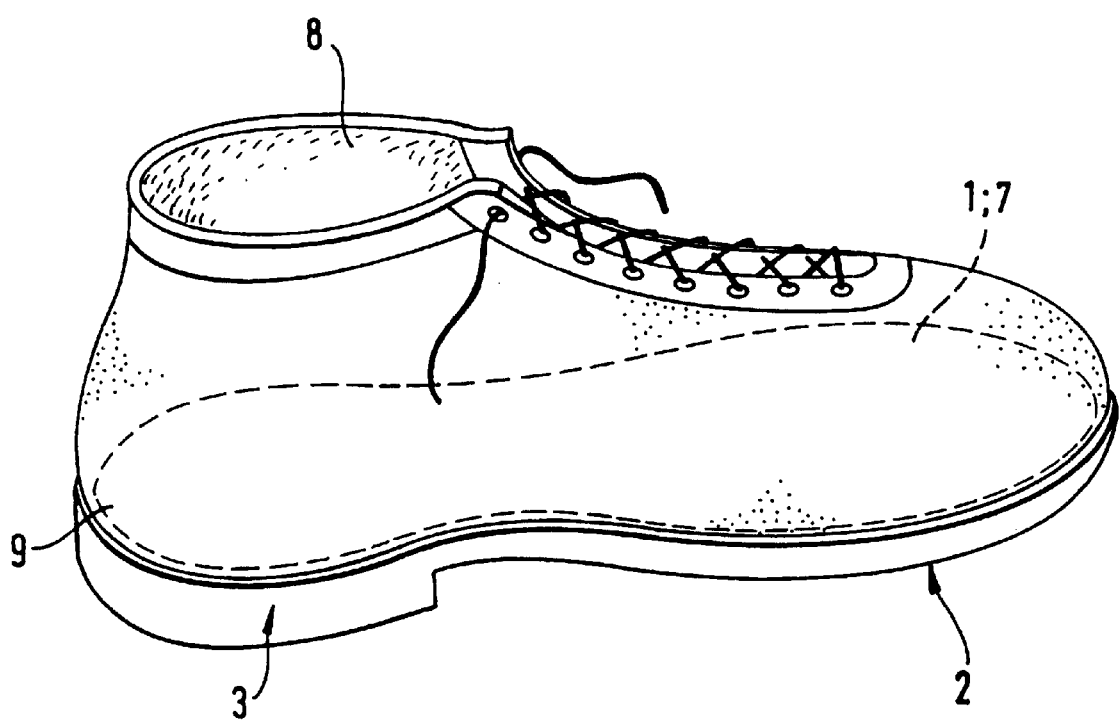
FIG. 7 shows a shoe with a breathable outsole (11).

The solution according to the invention for a breathable outsole is applicable in all shoes (FIG. 7).

For use in breathable and watertight footwear the entire shoe interior can additionally be equipped with a functional layer 8.

I claim:

1. Footwear having an insole and an outsole wherein the outsole is comprised of a top and a bottom layer, the top layer having a bottom surface and being comprised of a water vapor permeable material;

the bottom layer comprised of a frame along the edge around the periphery of the bottom surface of the top layer, and said bottom layer also having individual knobs or ribs located on the bottom surface of the top layer, said bottom layer constructed and arranged such that it covers less than 30% of the bottom surface or the top layer.

2. Footwear of claim 1 wherein the top layer of the outsole is a sintered plastic.

3. Footwear of claim 1 wherein the top layer of the outsole is a polyester, polypropylene or polyethylene.

4. Footwear of claim 1 wherein the knobs or ribs are not attached to the frame.

* * * * *